(12) United States Patent
Tsuji et al.

(10) Patent No.: US 10,327,124 B2
(45) Date of Patent: Jun. 18, 2019

(54) COMMUNICATION DEVICE AND TERMINAL DEVICE

(71) Applicant: BROTHER KOGYO KABUSHIKI KAISHA, Nagoya-shi, Aichi (JP)

(72) Inventors: Ryoya Tsuji, Nagoya (JP); Hirotaka Asakura, Nagoya (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 11 days.

(21) Appl. No.: 15/716,619

(22) Filed: Sep. 27, 2017

(65) Prior Publication Data

US 2018/0098184 A1    Apr. 5, 2018

(30) Foreign Application Priority Data

Sep. 30, 2016  (JP) .................................. 2016-194524

(51) Int. Cl.
| | |
|---|---|
| *H04W 4/80* | (2018.01) |
| *H04L 29/08* | (2006.01) |
| *H04W 12/06* | (2009.01) |
| *H04W 88/02* | (2009.01) |
| *H04W 92/18* | (2009.01) |
| *G06F 21/30* | (2013.01) |

(Continued)

(52) U.S. Cl.
CPC .............. *H04W 4/80* (2018.02); *G06F 21/30* (2013.01); *G06F 21/44* (2013.01); *H04L 67/141* (2013.01); *H04W 12/06* (2013.01); *H04W 88/02* (2013.01); *H04W 92/18* (2013.01); *H04W 4/50* (2018.02)

(58) Field of Classification Search
CPC ....... H04W 4/008; H04W 4/80; G06F 3/1287; G06F 21/34
See application file for complete search history.

(56) References Cited

U.S. PATENT DOCUMENTS

| | | | |
|---|---|---|---|
| 2002/0039343 A1* | 4/2002 | Shindo ..................... | G11B 7/12 369/112.29 |
| 2014/0168687 A1* | 6/2014 | Kim .................... | H04N 1/00342 358/1.14 |
| 2014/0349577 A1 | 11/2014 | Matsuda | |

(Continued)

FOREIGN PATENT DOCUMENTS

JP         2014-192821 A      10/2014

*Primary Examiner* — Myron Wyche
(74) *Attorney, Agent, or Firm* — Scully, Scott, Murphy & Presser, P.C.

(57) ABSTRACT

A communication device may supply both identification information for identifying a specific application program and first authentication information to a wireless interface so as to store both the identification information and the first authentication information in an interface memory. The wireless interface may be configured to send both the identification information and the first authentication information in the interface memory to a first terminal device by using a first communication session. The communication device may receive the first authentication information from the first terminal device by using a second communication session in a case where the second communication session with the first terminal device in which a specific application program has been installed is established via the wireless interface, and execute an authentication using the first authentication information in a case where the first authentication information is received.

10 Claims, 8 Drawing Sheets

(51) Int. Cl.
  *G06F 21/44* (2013.01)
  *H04W 4/50* (2018.01)

(56) References Cited

U.S. PATENT DOCUMENTS

2015/0096014 A1* 4/2015 Terashita ............... G06F 21/35
                                                      726/20
2016/0192124 A1  6/2016 Matsuda

* cited by examiner

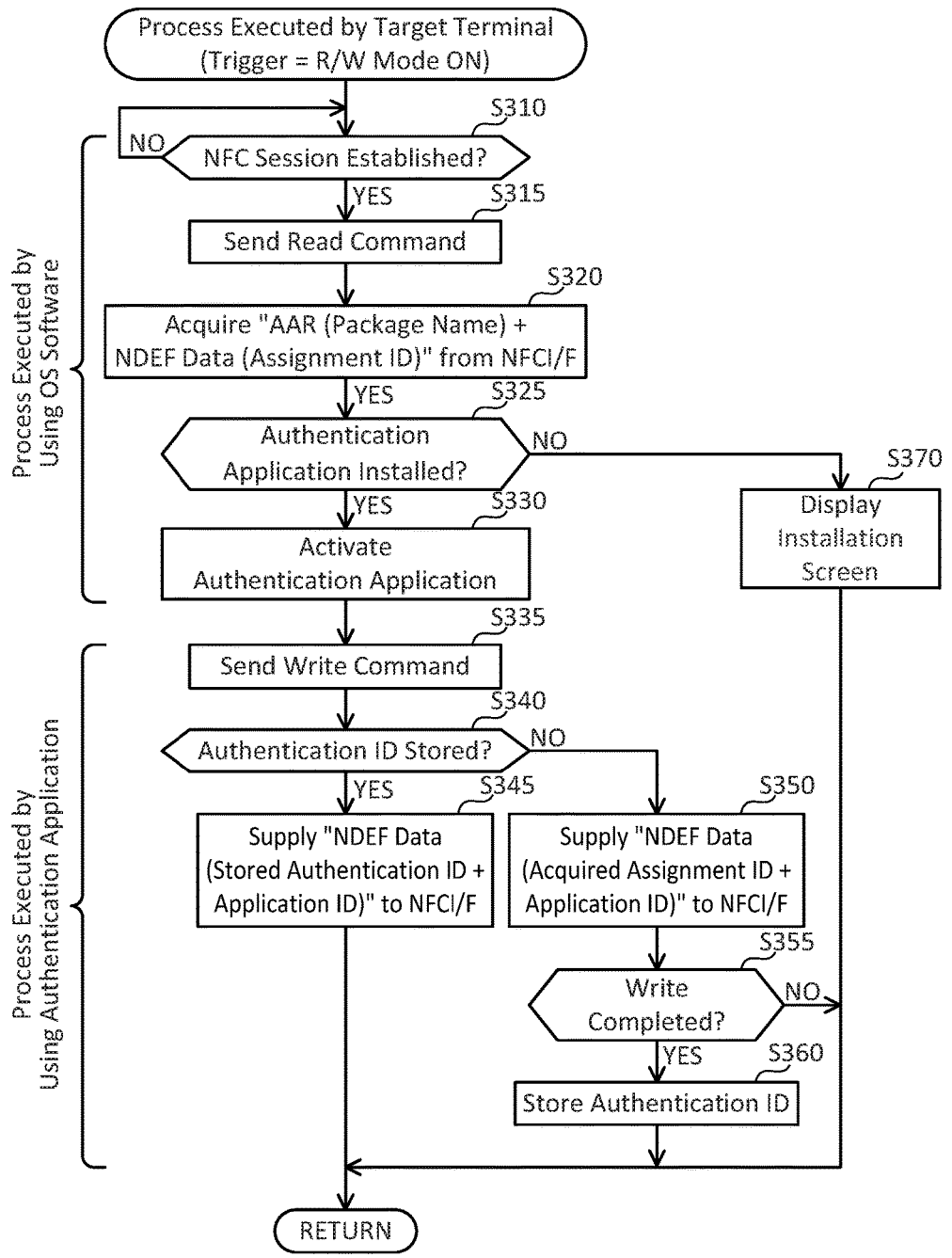

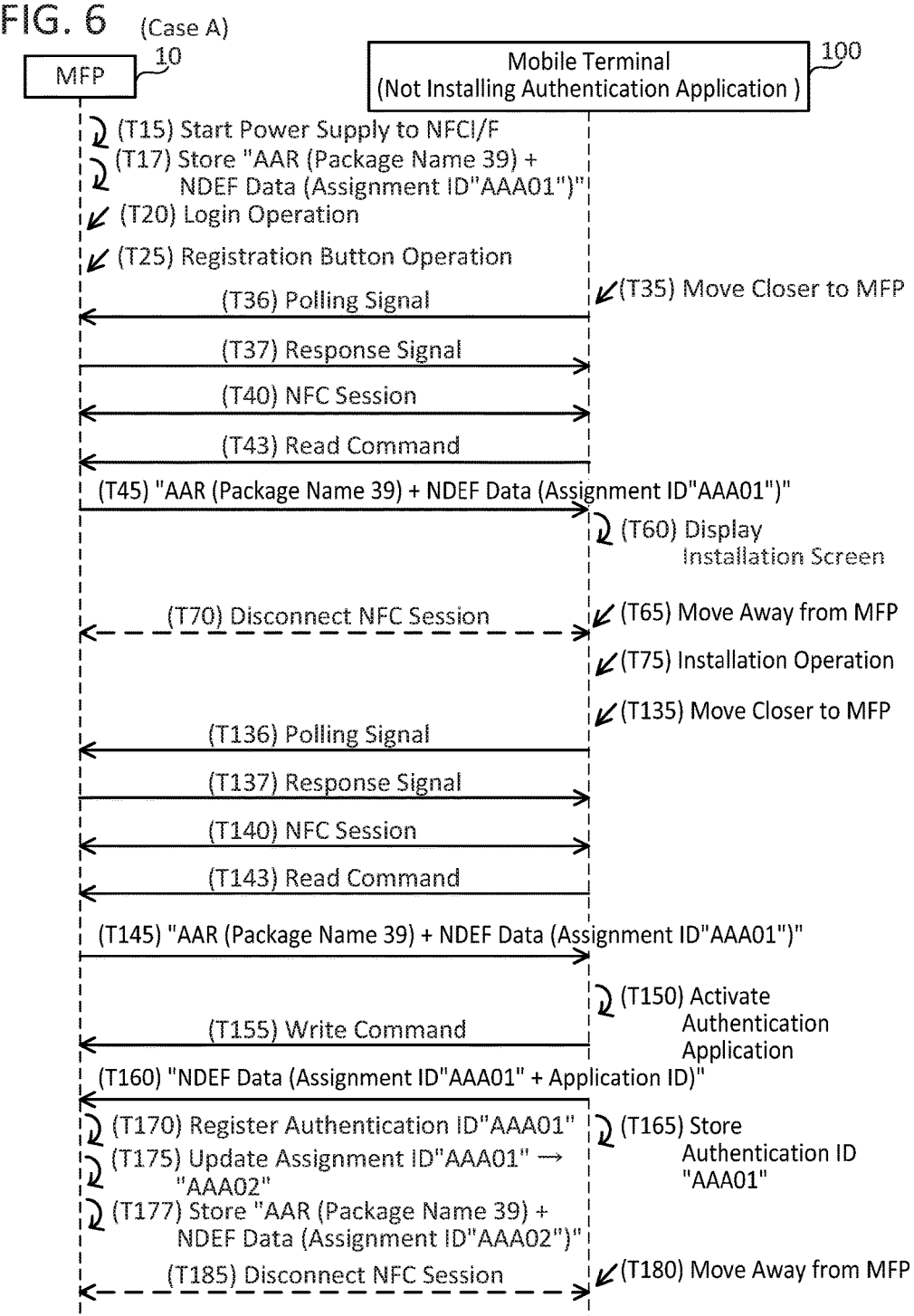

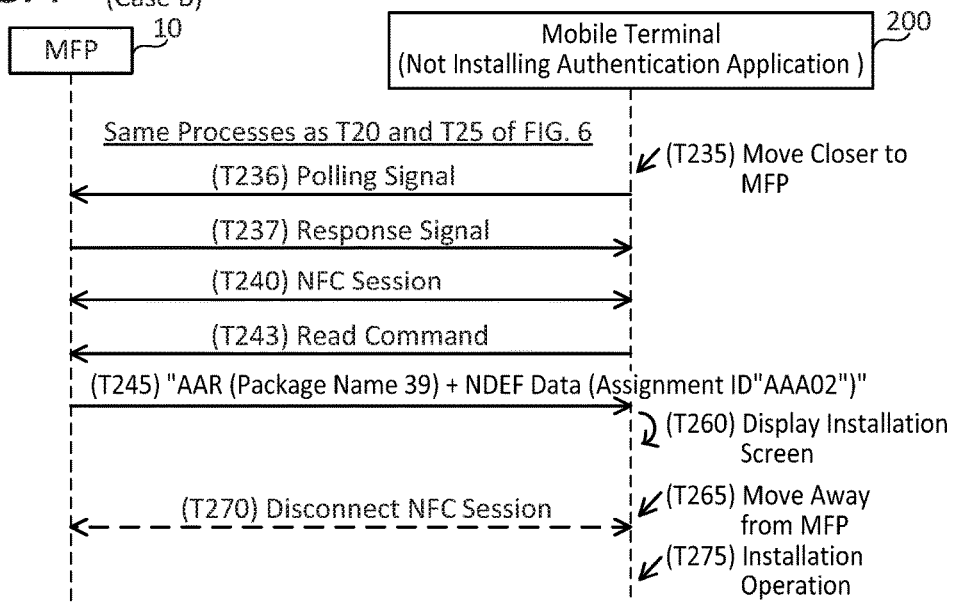
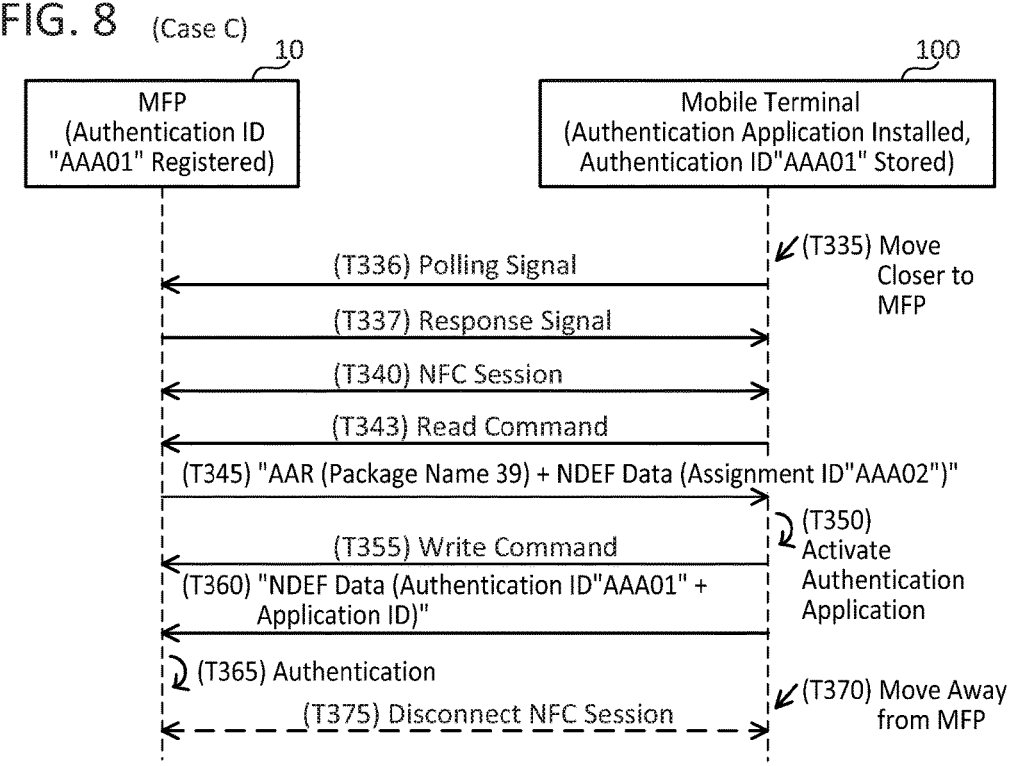

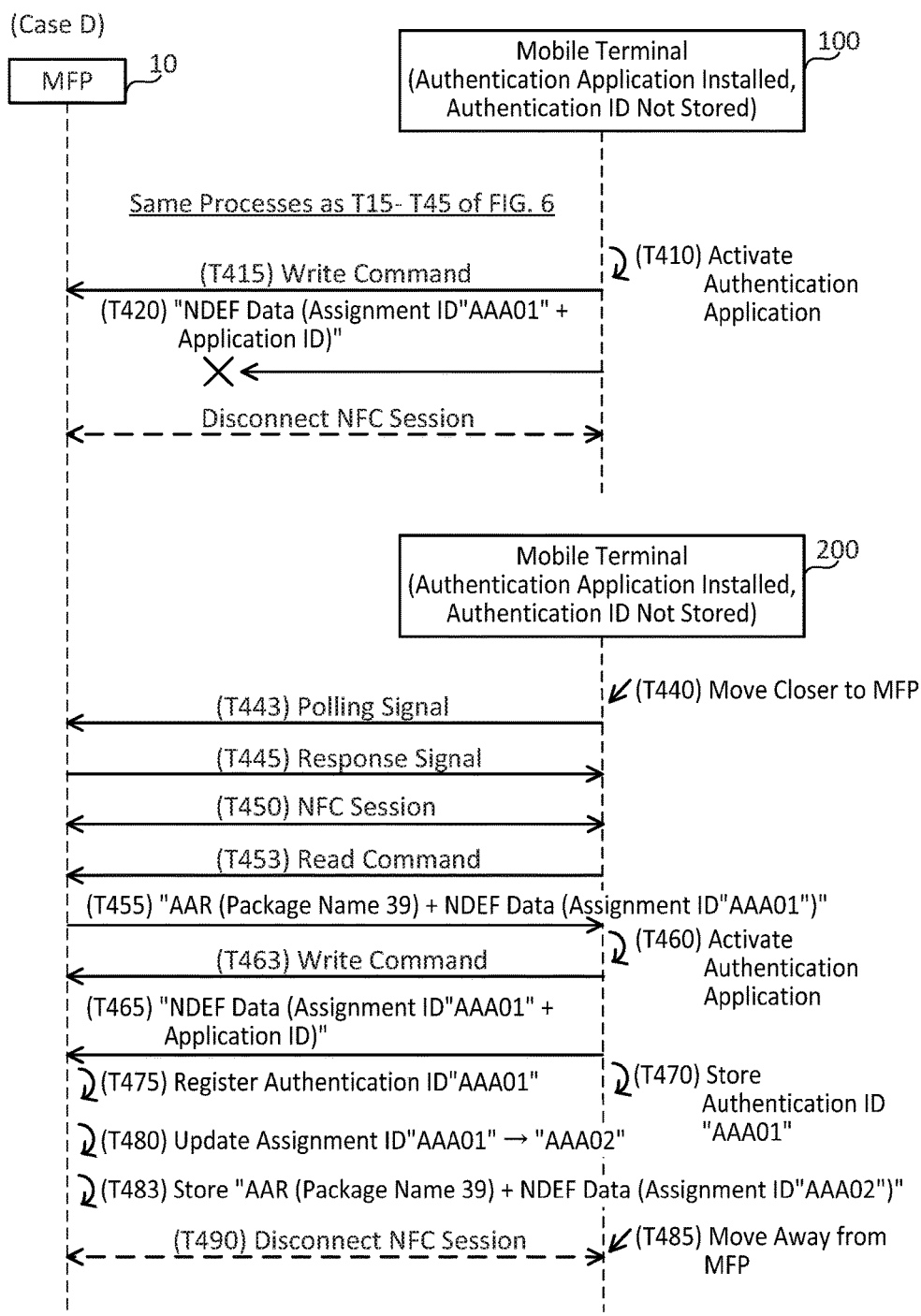

COMMUNICATION DEVICE AND TERMINAL DEVICE

TECHNICAL FIELD

The present disclosure discloses a communication device and a terminal device capable of performing a short distance wireless communication.

BACKGROUND ART

An authentication method is known which uses an authentication card comprising an NFC tag for performing an NFC (abbreviation of Near Field Communication) communication. The NFC tag stores an authentication ID in advance. For example, an administrator of an authentication device such as a printer inputs the authentication ID to the authentication device, and registers the authentication ID in the authentication device. Upon receiving the authentication ID from the authentication card by using the NFC communication, the authentication device determines whether the received authentication ID and the registered authentication ID match (i.e., executes an authentication). It should be noted that a similar authentication method using a terminal device instead of an authentication card is also known.

SUMMARY

The present disclosure discloses a novel authentication method using a terminal device.

A communication device disclosed in the present disclosure may comprise a wireless interface configured to perform a short distance wireless communication and comprising an interface memory; a processor; and a main memory storing computer-readable instructions therein, the computer-readable instructions, when executed by the processor, causing the communication device to: supply both identification information and first authentication information to the wireless interface so as to store both the identification information and the first authentication information in the interface memory, the identification information being for identifying a specific application program and for installing the specific application program, and the specific application program being for sending authentication information to the communication device and causing the communication device to execute an authentication using the authentication information, wherein the wireless interface is configured to send both the identification information and the first authentication information in the interface memory to a first terminal device by using a first communication session in a case where the first communication session with the first terminal device is established; receive the first authentication information from the first terminal device by using a second communication session in a case where the second communication session with the first terminal device in which the specific application program has been installed is established via the wireless interface after both the identification information and the first authentication information have been sent to the first terminal device; and execute an authentication using the first authentication information in a case where the first authentication information is received.

The present disclosure further discloses a non-transitory computer-readable recording medium storing computer-readable instructions for a terminal device, wherein the computer-readable instructions, when executed by a processor of the terminal device, may cause the terminal device to: determine whether registered authentication information which is registered in a communication device is stored in a non-volatile memory area of the terminal device in a case where a communication session with the communication device is established via a wireless interface of the terminal device, the wireless interface being configured to perform a short distance wireless communication; in a case where it is determined that the registered authentication information is stored in the non-volatile memory area, send the registered authentication information in the non-volatile memory area to the communication device by using the communication session so as to cause the communication device to execute an authentication using the registered authentication information; and in a case where it is determined that the registered authentication information is not stored in the non-volatile memory area, send received authentication information to the communication device by using the communication session so as to register the received authentication information in the communication device, the received authentication information being authentication information received from the communication device by using the communication session.

A control method, computer-readable instructions, and a non-transitory computer-readable recording medium storing the computer-readable instructions, for implementation of the aforementioned communication device are also novel and useful. A terminal device itself which is realized by the computer-readable instructions and a control method thereof are also novel and useful. Further, a communication system which comprises the aforementioned communication device and terminal device is also novel and useful.

BRIEF DESCRIPTION OF THE DRAWINGS

FIG. 5 shows a flowchart of a process executed by a target terminal;
FIG. 6 shows a sequence diagram of a case A in which an authentication ID is registered;
FIG. 7 shows a sequence diagram of a case B in which an assignment ID after an update is sent;
FIG. 8 shows a sequence diagram of a case C in which an authentication is executed;
and
FIG. 9 shows a sequence diagram of a case D in which a registration is re-tried.

EMBODIMENTS (Configuration of Communication System 2; FIG. 1)

As shown in FIG. 1, a communication system 2 comprises a multi-function peripheral 10 (called "MFP (abbreviation of Multi-Function Peripheral)" below), and mobile terminals 100, 200. Each of the devices 10, 100, 200 is capable of performing a wireless communication according to an NFC (abbreviation of Near Field Communication) system (called "NFC communication" below).

(Configuration of MFP 10)

Figure 1:
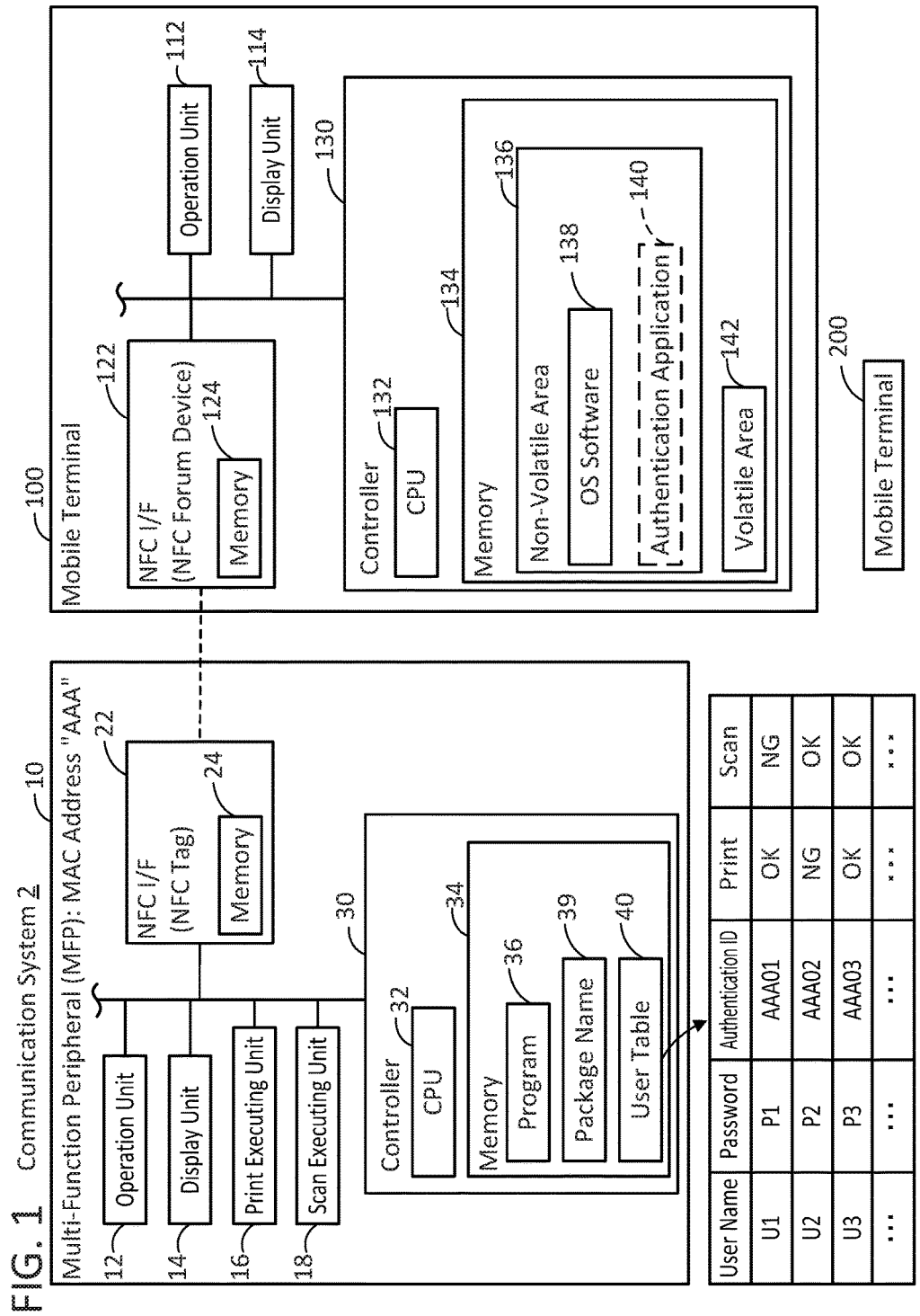
FIG. 1 shows a configuration of a communication system.

The MFP 10 comprises an operation unit 12, a display unit 14, a print executing unit 16, a scan executing unit 18, an NFC I/F 22, and a controller 30.

The operation unit 12 comprises a plurality of keys. A user can input various instructions to the MFP 10 by operating the operation unit 12. The display unit 14 is a display for displaying various information. The display unit 14 also functions as a so-called touch panel. That is, the display unit 14 also functions as an operation unit. Therefore, below, the operation unit 12 and the display unit 14 may collectively be termed "operation units 12, 14". The print executing unit 16 comprises a printing mechanism such as an ink jet scheme, a laser scheme, or the like. The scan executing unit 18 comprises a scanning mechanism such as a CCD, a CIS, or the like.

The NFC I/F 22 is an I/F for executing the NFC communication. The NFC system is a wireless communication system based on international standards such as e.g., ISO/IEC14443, 15693, 18092. It should be noted that an I/F called an NFC forum device and an I/F called an NFC tag are known as types of I/F for executing the NFC communication. The NFC forum device is an I/F capable of selectively operating in any of a P2P (abbreviation of Peer To Peer) mode, an R/W (abbreviation of Reader/Writer) mode, and a CE (abbreviation of Card Emulation) mode. The NFC tag is not an I/F capable of selectively operating in any of these modes, but functions as an IC (abbreviation of Integrated Circuit) tag of the NFC system.

The P2P mode is a mode for performing a bidirectional communication between one NFC apparatus operating in the P2P mode and another NFC apparatus operating in the P2P mode. The R/W mode and the CE mode are modes for performing a unidirectional communication between one NFC apparatus operating in the R/W mode and another NFC apparatus operating in the CE mode. It should be noted that the CE mode may be a CE mode requiring a secure element, or an HCE (abbreviation of Host Card Emulation) mode not requiring a secure element. A Reader mode in the R/W mode is a mode for reading out data from an NFC apparatus operating in the CE mode. A Writer mode in the R/W mode is a mode for writing data to an NFC apparatus operating in the CE mode. It should be noted that an NFC apparatus operating in the R/W mode can read out data from an NFC tag and write data to the NFC tag.

The NFC I/F 22 is an NFC tag. Since an NFC tag is cheaper than an NFC forum device, a manufacturing cost of the MFP 10 can be reduced. In a case of receiving a polling signal from a partner device and sending a response signal for the polling signal to the partner device, the NFC I/F 22 establishes an NFC session with the partner device. The NFC I/F 22 comprises a memory 24.

The controller 30 comprises a CPU 32 and a memory 34. The CPU 32 executes various processes in accordance with a program 36 stored in the memory 34. The memory 34 is constituted of a volatile memory, a non-volatile memory, and the like. Further, the memory 34 stores a package name 39 and a user table 40. The package name 39 is a package name of an authentication application 140 to be installed in the mobile terminals 100, 200. The package name is a name obtained by arranging a domain in its reverse order, such as "com.example.android.beam".

A user name, a password, an authentication ID, print permission information, and scan permission information are associated with each other in the user table 40. The user name, the password, the print permission information and the scan permission information are registered in the user table 40 by, e.g., an administrator of the MFP 10 operating the operation units 12, 14, or accessing the MFP 10 from a mobile terminal. The print permission information and the scan permission information respectively indicate whether or not a printing function and a scanning function are permitted to the user. In each of the permission information, "OK" indicates that a use of its corresponding function is permitted, and "NG" indicates that the use of the corresponding function is not permitted. The authentication ID is identification information for identifying the mobile terminal, and is generated and registered by the MFP 10. The authentication ID includes a combination of a MAC address "AAA" of the MFP 10 and a numeral part which is constituted of a multi-digit numeral (two-digit numeral in the present embodiment). It should be noted, in a modification, the authentication ID may be, for example, a random character string. Further, in another modification, the user table 40 may be stored in a memory of an external device different from the MFP 10. In this case, the MFP 10 can communicate with the external device to use the information in the user table 40.

(Configuration of Mobile Terminal 100)

The mobile terminals 100, 200 are portable terminal devices such as a mobile telephone, a smartphone, a PDA, a notebook PC, a tablet PC, a portable music playback device or a portable movie playback device. Since the mobile terminal 200 comprises a same configuration as the mobile terminal 100, only the mobile terminal 100 will be described below. The mobile terminal 100 comprises an operation unit 112, a display unit 114, an NFC I/F 122, and a controller 130.

The operation unit 112 comprises a plurality of keys. The user can input various instructions to the mobile terminal 100 by operating the operation unit 112. The display unit 114 is a display for displaying various information. The display unit 114 also functions as a so-called touch panel. That is, the display unit 114 also functions as an operation unit. Therefore, below, the operation unit 112 and the display unit 114 may collectively be termed "operation units 112, 114". The NFC I/F 122 is an NFC forum device and comprises a memory 124.

The controller 130 comprises a CPU 132 and a memory 134. The CPU 132 executes various processes in accordance with an OS software 138 stored in the memory 134. The OS software 138 is software for controlling various basic operations of the mobile terminal 100.

The memory 134 comprises a non-volatile area 136 and a volatile area 142. The OS software 138 is stored in the non-volatile area 136. The authentication application 140 may further be stored in the non-volatile area 136. The authentication application 140 is an application for causing the MFP 10 to execute an authentication by using an authentication ID. The authentication application 140 is provided by a vendor of the MFP 10 and is installed in the mobile terminal 100 from, e.g., a server on the Internet. The volatile area 142 stores information acquired or generated during the CPU 132 executing processes.

Figure 2:
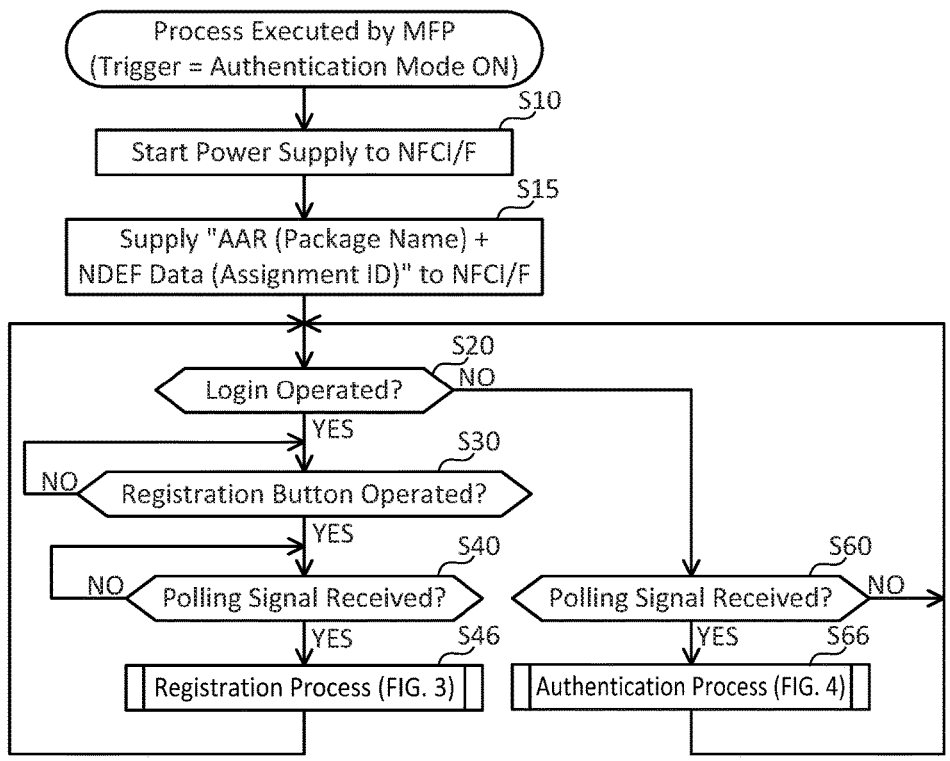
FIG. 2 shows a flowchart of a process executed by a multi-function peripheral.

(Process Executed by MFP 10; FIG. 2)

Next, a process executed by the CPU 32 of the MFP 10 will be described with reference to FIG. 2. The process of FIG. 2 is started when an operation for changing a setting of an authentication mode from OFF to ON is performed in the operation units 12, 14. The authentication mode is an operation mode for executing a registration of an authentication ID or for executing an authentication using an authentication ID.

In S10, the CPU 32 starts power supply to the NFC I/F 22. As a result, the NFC I/F 22 can receive a polling signal and send a response signal for the polling signal.

In S15, the CPU 32 supplies both an AAR (abbreviation of "Android Application Record") including the package name 39 and NDEF (abbreviation of "NFC Data Exchange Format") data including a current assignment ID to the NFC I/F 22, and stores both the AAR and the NDEF data in the memory 24. The AAR is information instructing an activation of the authentication application 140 specified by the package name 39. The assignment ID is information to be assigned to a mobile terminal and is information to be registered in the user table 40 as an authentication ID of the mobile terminal. The assignment ID includes a combination of the MAC address "AAA" (not shown) of the MFP 10 stored, in advance, in the memory 34 and a numeral part which is constituted of a multi-digit numeral (two-digit numeral in the present embodiment). The numeral part has "00" as an initial value. Each time an assignment ID is registered in the user table 40 as an authentication ID, the numeral of its numeral part is incremented only by "1" to generate a new assignment ID. It should be noted, in a modification, the assignment ID may, for example, be a random character string.

In S20, the CPU 32 monitors whether a login operation is performed on the operation units 12, 14 by the user. In a case where a combination of the user name and the password registered in the user table 40 has been inputted in the operation units 12, 14, the CPU 32 determines YES in S20, and proceeds to S30.

In S30, the CPU 32 monitors whether a registration button for registering the authentication ID in the user table 40 is operated. In a case where the registration button is operated in the operation units 12, 14 (YES in S30), the CPU 32 proceeds to S40. It should be noted, although not shown, in a case where a button different from the registration button (e.g., a scan start button) is operated, the CPU 32 executes a process corresponding to the different button (e.g., a scan process).

In S40, the CPU 32 monitors whether the NFC I/F 22 receives a polling signal from a target terminal (e.g., the mobile terminal 100, or the mobile terminal 200). When the user moves the target terminal provided with the NFC I/F which is operating in the R/W mode closer to the MFP 10, a distance between the target terminal and the NFC I/F 22 becomes smaller than a maximum distance with which the NFC communication can be executed (e.g., 10 cm). In this case, the NFC I/F 22 receives the polling signal from the target terminal, and sends a response signal to the target terminal. Thereby, an NFC session is established between the NFC I/F 22 and the target terminal. In a case where the NFC session with the target terminal is established, the NFC I/F 22 supplies information indicating that the NFC session has been established to the controller 30. In a case of acquiring the information from the NFC I/F 22, the CPU 32 determines YES in S40, and executes a registration process of FIG. 3 in S46. When S46 ends, the process returns to S20.

S60 is the same as S40. In a case of determining YES in S60, in S66, the CPU 32 executes an authentication process of FIG. 4. In a case of determining NO in S60, or in a case where S66 ends, the process returns to S20. It should be noted, although not shown, when an operation for changing the setting of the authentication mode from ON to OFF is executed in the operation units 12, 14, the process of FIG. 2 ends.

Figure 3:
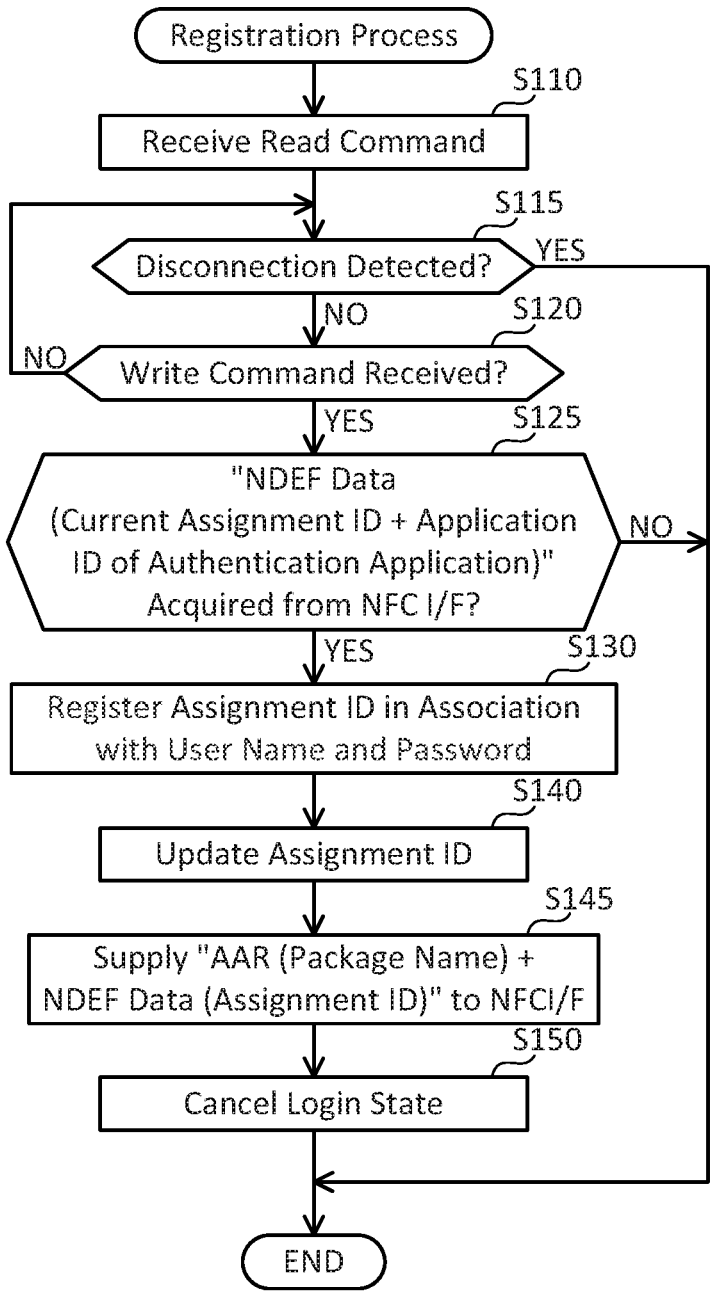
FIG. 3 shows a flowchart of a registration process.

(Registration Process; FIG. 3)

Next, the registration process executed in S46 of FIG. 2 will be described with reference to FIG. 3. In S110, the CPU 32 receives a read command from the target terminal via the NFC I/F 22 by using the NFC session established in S40 of FIG. 2. The read command is a confirmation signal for confirming whether it is possible to execute a readout of information (i.e., whether the NFC I/F 22 is capable of sending information). In a case of receiving the read command from the target terminal, the NFC I/F 22 sends an OK command for the read command. Then, by using the NFC session, the NFC I/F 22 sends both the AAR and the NDEF data in the memory 24 to the target terminal. The NFC I/F 22 further supplies the read command to the controller 30. By acquiring the read command from the NFC I/F 22 (i.e., by executing the process of S110), the CPU 32 can confirm that both the AAR and the NDEF data have been sent to the target terminal.

In S115, the CPU 32 monitors whether the NFC session with the target terminal is disconnected. For example, when the user moves the target terminal away from the MFP 10, the distance between the target terminal and the NFC I/F 22 of the MFP 10 becomes longer than the maximum distance with which the NFC communication can be executed, and consequently the NFC session is disconnected. In this case, the NFC I/F 22 supplies information indicating that the NFC session has been disconnected to the controller 30. In a case of acquiring the information from the NFC I/F 22, the CPU 32 determines YES in S115, and ends the registration process of FIG. 3.

In S120, the CPU 32 monitors whether a write command is received from the target terminal via the NFC I/F 22 by using the NFC session established in S40 of FIG. 2. The write command is a confirmation signal for confirming whether it is possible to execute a writing of information (i.e., whether the NFC I/F 22 is capable of receiving information). The write command is sent from the target terminal in a case where the authentication application 140 has been installed in the target terminal (see S335 of FIG. 5, to be described later). In a case of receiving the write command from the target terminal, the NFC I/F 22 sends an OK command for the write command. In this case, the NFC I/F 22 supplies the write command to the controller 30. In a case of acquiring the write command from the NFC I/F 22, the CPU 32 determines YES in S120, and proceeds to S125.

In S125, the CPU 32 determines whether NDEF data including the current assignment ID and an application ID of the authentication application 140 has been acquired from the NFC I/F 22. In the case where the OK signal for the write command is sent to the target terminal, the NFC I/F 22 acquires NDEF data including an assignment ID and an application ID from the target terminal. Here, the assignment ID included in the NDEF data is an assignment ID which had been sent in the past from the MFP 10 to the target terminal. Further, the application ID included in the NDEF data is information for identifying an application currently running in the target terminal (e.g., the authentication application 140). The NFC I/F 22 supplies the NDEF data including the assignment ID and the application ID to the controller 30. The CPU 32 determines whether the assignment ID acquired from the NFC I/F 22 matches the current assignment ID. In a situation in which S145, which will be described later, has not been executed even once after the execution of S15 of FIG. 2, the current assignment ID is the assignment ID supplied to the NFC I/F 22 in S15. Further, in a situation in which S145, which will be described later, has been executed after the execution of S15 of FIG. 2, the current assignment ID is the assignment ID supplied to the NFC I/F 22 in the latest S145. Further, the CPU 32 determines whether the application ID acquired from the NFC I/F 22 matches an application ID (not shown) of the authentication application 140 stored in advance in the memory 34. The CPU 32 proceeds to S130 in a case of determining that the assignment ID acquired from the NFC I/F 22 and the current assignment ID match as well as determining that the application ID acquired from the NFC I/F 22 and the application ID of the authentication application 140 match (YES in S125). On the other hand, the CPU 32 ends the registration process of FIG. 3 in a case of determining that the acquired assignment ID and the current assignment ID do not match (NO in S125). For example, such an event can occur in a situation where the acquired assignment ID has already been registered in the user table 40. Further, the CPU 32 ends the registration process of FIG. 3 in a case of determining that the acquired application ID and the application ID of the authentication application 140 do not match (NO in S125). For example, such an event can occur in a situation where, due to the target terminal running an application different from the authentication application 140, an application ID of that application is received.

In S130, the CPU 32 registers, in the user table 40, the acquired assignment ID (i.e., the current assignment ID) in association with the user name and the password inputted in S20 of FIG. 2, as the authentication ID.

In S140, the CPU 32 updates the assignment ID. Specifically, the CPU 32 increments the numeral part (e.g., "01") included in the current assignment ID only by "1" to generate a new numeral part (e.g., "02"). Then, the CPU 32 combines the MAC address "AAA" of the MFP 10 and the new numeral part to generate a new assignment ID (e.g., "AAA02").

In S145, the CPU 32 supplies both the AAR including the package name 39, and NDEF data including the new assignment ID updated in S140, to the NFC I/F 22, and stores both the AAR and the NDEF data in the memory 24 instead of the information currently being stored in the memory 24.

In S150, the CPU 32 cancels the login state. That is, the CPU 32 shifts to a state capable of accepting an input of a user name and a password (i.e., a state of executing the monitoring of S20 of FIG. 2). When S150 ends, the registration process of FIG. 3 ends.

Figure 4:
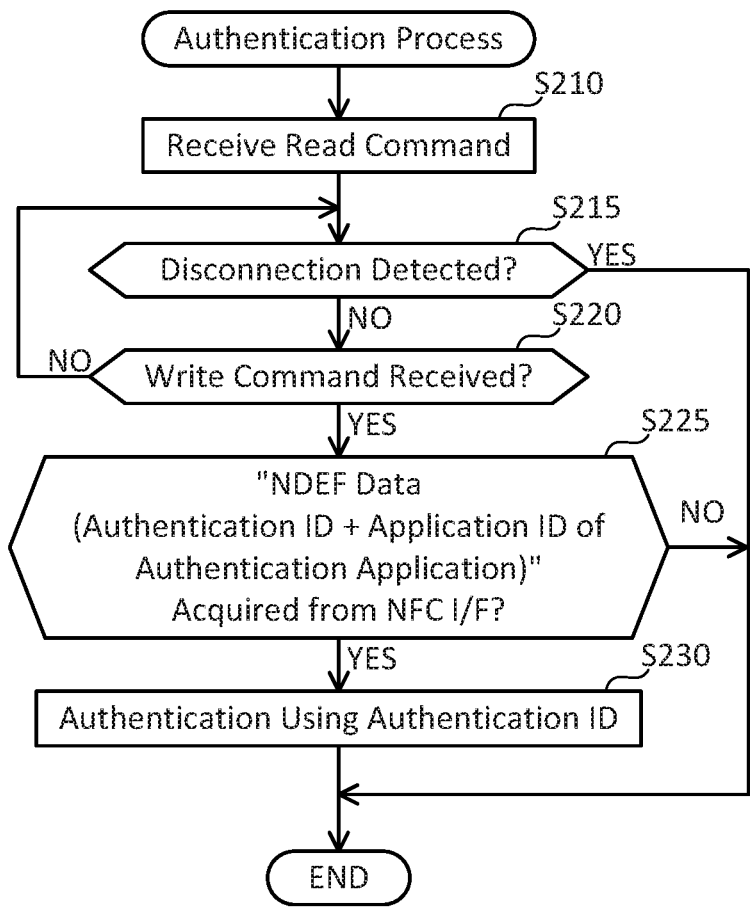
FIG. 4 shows a flowchart of an authentication process.

(Authentication Process; FIG. 4)

Next, the authentication process executed in S66 of FIG. 2 will be described with reference to FIG. 4. S210 to S220 are the same as S110 to S120 of FIG. 3.

In S225, the CPU 32 determines whether NDEF data including the application ID of the authentication application 140 has been acquired from the NFC I/F 22. In a case of determining that an application ID included in the NDEF data acquired from the NFC I/F 22 and the application ID of the authentication application 140 stored in advance in the memory 34 match (YES in S225), the CPU 32 proceeds to S230. In this case, the NDEF data includes an authentication ID stored in a non-volatile memory of the target terminal (see S345 of FIG. 5, to be described later). On the other hand, in a case of determining that the acquired application ID and the application ID of the authentication application 140 do not match (NO in S225), the CPU 32 ends the authentication process of FIG. 4.

In S230, the CPU 32 executes an authentication by using the authentication ID included in the NDEF data acquired from the NFC I/F 22. Specifically, the CPU 32 determines whether the acquired authentication ID has been registered in the user table 40. In a case of determining that the acquired authentication ID has been registered in the user table 40, the CPU 32 determines that the authentication succeeds. In this case, the CPU 32 permits the use of the functions corresponding to the respective permission information associated with the acquired authentication ID. Specifically, in a case where the print permission information is "OK", the CPU 32 permits an execution of printing. For example, when an operation for downloading print data from a server on the Internet is performed on the operation units 12, 14, the CPU 32 can receive the print data from the server and cause the print executing unit 16 to execute printing of an image represented by the print data. Further, in a case where the scan permission information is "OK", the CPU 32 permits an execution of scanning. For example, when a button for executing a scan is operated, the CPU 32 causes the scan executing unit 18 to scan a document. On the other hand, in a case of determining that the acquired authentication ID is not registered in the user table 40, the CPU 32 determines that the authentication has failed. For example, such an event can occur in a case where the administrator of the MFP 10 has deleted the acquired authentication ID from the user table 40. When S230 ends, the authentication process of FIG. 4 ends.

(Process Executed by Mobile Terminal; FIG. 5)

Next, a process executed by the CPU 132 of the mobile terminal 100 will be described with reference to FIG. 5. For example, when an operation for activating an operation of the NFC I/F 122 is executed on the operation units 112, 114, the NFC I/F 122 operates in the R/W mode. Thereby, the process of FIG. 5 is started. The CPU 132 executes S310 to S330, and S370 by using the OS software 138 (i.e., without using the authentication application 140), and executes S335 to S360 by using the authentication application 140. It should be noted that the same process as that in FIG. 5 is also executed on the mobile terminal 200.

In S310, the CPU 132 monitors whether the NFC I/F 122 establishes the NFC session with the MFP 10. In a case of acquiring information indicating that the NFC session has been established from the NFC I/F 122, the CPU 132 determines YES in S310, and proceeds to S315.

In S315, the CPU 132 sends the read command to the MFP 10 via the NFC I/F 122 by using the NFC session with the MFP 10 (see S110 of FIG. 3, S210 of FIG. 4). As a result, the NFC I/F 122 receives the OK command for the read command from the MFP 10, receives both the AAR including the package name 39 and the NDEF data including the assignment ID from the MFP 10 by using the NFC session, and supplies both the AAR and the NDEF data to the controller 130.

In S320, the CPU 132 acquires both the AAR and the NDEF data from the NFC I/F 122. Here, the CPU 132 stores both the AAR and the NDEF data in the volatile area 142 in the memory 134.

In S325, the CPU 132 determines whether the authentication application 140 has been installed. The CPU 132 specifies a domain name of the authentication application 140 based on the package name 39 in the AAR stored in the volatile area 142 in S320. In a case where the authentication application 140 specified by the domain name has been installed (YES in S325), the CPU 132 proceeds to S330. On the other hand, in a case where the authentication application 140 has not been installed (NO in S325), the CPU 132 proceeds to S370.

In S370, the CPU 132 causes the display unit 114 to display an installation screen by using the domain name of the authentication application 140. The installation screen is a screen for installing the authentication application 140 specified by the package name 39. The CPU 132 installs the authentication application 140 in a case where an operation for installing the authentication application 140 is performed on the installation screen in the operation units 112, 114. When S370 ends, the process returns to S310.

In S330, the CPU 132 activates the authentication application 140. Thereby, the subsequent processes of S335 to S360 are realized by the authentication application 140.

In S335, the CPU 132 sends the write command to the MFP 10 via the NFC I/F 122 by using the NFC session with the MFP 10 (see S120 of FIG. 3, S220 of FIG. 4). As a result, the NFC I/F 122 receives the OK command for the write command from the MFP 10.

In S340, the CPU 132 determines whether the authentication ID has been stored in the non-volatile area 136 in the memory 134. In a case where the authentication ID has been stored in the non-volatile area 136 in S360 to be described later, the CPU 132 determines YES in S340, and proceeds to S345. On the other hand, in a case where the authentication ID is not being stored in the non-volatile area 136, the CPU 132 determines NO in S340, and proceeds to S350.

In S345, the CPU 132 supplies, to the NFC I/F 122, the NDEF data including the authentication ID being stored in the non-volatile area 136 and the application ID of the authentication application 140. Thereby, by using the NFC session with the MFP 10, the NFC OF 122 sends the NDEF data to the MFP 10 and can cause the MFP 10 to execute the authentication by using the authentication ID in the NDEF data (see S230 of FIG. 4). When S345 ends, the process returns to S310.

In S350, the CPU 132 supplies, to the NFC I/F 122, the NDEF data including the assignment ID acquired in S320 (i.e., the assignment ID stored in the volatile area 142 in S320) and the application ID of the authentication application 140 that is currently activated. Thereby, by using the NFC session with the MFP 10, the NFC I/F 122 sends the NDEF data to the MFP 10 and can cause the MFP 10 to register the assignment ID in the NDEF data as the authentication ID (see S130 of FIG. 3). In this way, depending on whether the authentication ID is being stored in the non-volatile area 136 or not (S340), the CPU 132 can appropriately cause the MFP 10 to execute the authentication using the authentication ID or the registration of the assignment ID.

In S355, the CPU 132 determines whether a writing of the NDEF data to the MFP 10 has been completed. When the sending of the NDEF data to the MFP 10 is completed, the NFC OF 122 supplies information indicating that the writing of the NDEF data has been completed to the controller 130. In this case, the CPU 132 determines YES in S355, and proceeds to S360. On the other hand, for example, a situation can be assumed in which the NFC session with the MFP 10 is disconnected due to the mobile terminal 100 being moved away from the MFP 10, before the sending of the NDEF data to the MFP 10 is completed. In this case, the NFC I/F 122 supplies information indicating that the NFC session has been disconnected to the controller 130, without supplying the information indicating that the writing of the NDEF data has been completed to the controller 130. In this case, the CPU 132 determines NO in S355, skips S360, and returns to S310.

In S360, the CPU 132 stores the assignment ID acquired in S320 (i.e., the assignment ID stored in the volatile area 142 in S320) in the non-volatile area 136 as the authentication ID. Thereby, in a case where the NFC session with the MFP 10 is re-established (YES in S310), the CPU 132 can cause the MFP 10 to execute the authentication by using the authentication ID in the non-volatile area 136 (YES in S340, S345). When S360 ends, the process returns to S310.

(Specific Cases)

Next, specific cases A to D realized by the processes of FIG. 2 to FIG. 5 will be described with reference to FIG. 6 to FIG. 9. In an initial status of each of the cases A to D, the authentication mode of the MFP 10 is set to ON, and the NFC I/F 122 of the mobile terminal 100 is operating in the R/W mode.

(Case A; FIG. 6)

In the initial status of the case A of FIG. 6, the authentication application 140 is not installed in the mobile terminal 100. In T15, the MFP 10 starts the power supply to the NFC I/F 22 (S10 of FIG. 2), and in T17, stores both the AAR including the package name 39 and the NDEF data including an assignment ID "AAA01" in the memory 24 in the NFC I/F 22 (S15).

In T20, the user performs the login operation in the MFP 10 (YES in S20 of FIG. 2), and in T25, operates the registration button (YES in S30). Then, in T35, the user moves the mobile terminal 100 closer to the MFP 10.

In T36, the MFP 10 receives the polling signal from the mobile terminal 100, and in T37, sends the response signal to the mobile terminal 100 (YES in S40 of FIG. 2). As a result, in T40, the NFC session is established between the MFP 10 and the mobile terminal 100.

In T43, the MFP 10 receives the read command from the mobile terminal 100 by using the NFC session established in T40 (S110 of FIG. 3), and sends the OK command to the mobile terminal 100 by using the NFC session. Then, in T45, the MFP 10 sends both the AAR including the package name 39 and the NDEF data including the assignment ID "AAA01" to the mobile terminal 100 by using the NFC session.

Upon receiving the AAR and the NDEF data from the MFP 10 by using the NFC session (S320 of FIG. 5), since the authentication application 140 has not been installed (NO in S325), in T60, the mobile terminal 100 displays the installation screen (S370).

In T65, the user moves the mobile terminal 100 away from the MFP 10. Thereby, in T70, the NFC session between the mobile terminal 100 and the MFP 10 is disconnected (YES in S115 of FIG. 3). In T75, the user performs an installation operation in the mobile terminal 100. Thereby, the authentication application 140 is installed in the mobile terminal 100.

T135 to T145, which are executed thereafter, are the same as T35 to T45. Since the authentication application 140 has been installed (YES in S325 of FIG. 5), in T150, the mobile terminal 100 activates the authentication application 140 (S330).

In T155, the MFP 10 receives the write command from the mobile terminal 100 by using the NFC session established in T140 (YES in S120 of FIG. 3), and sends the OK command to the mobile terminal 100 by using the NFC session.

Upon receiving the OK command from the MFP 10, since the authentication ID is not being stored in the non-volatile area 136 (NO in S340 of FIG. 5), in T160, the mobile terminal 100 sends the NDEF data, which includes the assignment ID "AAA01" received in T145 and the application ID of the authentication application 140, to the MFP 10 by using the NFC session established in T140 (S350). Then, in T165, the mobile terminal 100 stores the assignment ID "AAA01" in the non-volatile area 136 as the authentication ID (S360).

Upon receiving the NDEF data from the mobile terminal 100 by using the NFC session established in T140 (YES in S125 of FIG. 3), in T170, the MFP 10 registers the assignment ID "AAA01" in the NDEF data in the user table 40 as the authentication ID (S130). Then, in T175, the MFP 10 updates the assignment ID "AAA01" to "AAA02" (S140), and in T177, stores both the AAR including the package name 39 and NDEF data including the assignment ID "AAA02" in the memory 24 in the NFC I/F 22 (S145). As described, the MFP 10 updates the assignment ID each time an authentication ID is registered, but does not update the assignment ID unless an authentication ID is registered. For example, if a configuration of a comparative example is adopted which updates the assignment ID each time NDEF data is sent in response to the read command, the assignment ID is updated even when the NDEF data is sent in T45, and a process of storing the new assignment ID in the memory 24 in the NFC I/F 22 is required to be executed. By contrast, in the present embodiment, such a process need not be executed when the NDEF data is sent in T45, and therefore a processing load of the MFP 10 can be reduced. It should be noted, in a modification, the configuration of the comparative example described above may be adopted. T180, T185 are the same as T65, T70.

(Effect of Case A)

In the present case, regardless of the status of the mobile terminal 100 (i.e., whether the authentication application 140 has been installed or not), the MFP 10 sends both the AAR including the package name 39 and the NDEF data including the assignment ID "AAA01" to the mobile terminal 100 (T45, T145). Thereby, in the case of receiving the AAR and the NDEF data from the MFP 10 for the first time (T45), the mobile terminal 100 can install the authentication application 140 by using the package name 39 included in the AAR (T75). Then, in the case of receiving the AAR and the NDEF data from the MFP 10 for the second time (T145), the mobile terminal 100 can cause the MFP 10 to register the assignment ID "AAA01" included in the NDEF data as the authentication ID (T170). If a configuration is adopted in which the MFP 10 sends only one of the AAR and the NDEF data to the mobile terminal 100 depending on whether or not the authentication application 140 has already been installed, it is necessary that the MFP 10 receives information indicating whether the authentication application 140 has already been installed from the mobile terminal 100. By contrast, in the present embodiment, the MFP 10 does not need to receive such information from the mobile terminal 100, and further, does not need to change the information to be sent to the mobile terminal 100. For this reason, the processing load of the MFP 10 can be reduced.

It should be noted, in a case where, instead of the mobile terminal 100, the mobile terminal 200 in which the authentication application 140 is not installed is moved closer to the MFP 10 after T75, the MFP 10 and the mobile terminal 200 execute the same processes as T37 to T60. That is, in a case where an NFC session with the mobile terminal 200 is established before the assignment ID "AAA01" is updated (i.e., before the authentication ID "AAA01" is registered), the MFP 10 sends the assignment ID "AAA01" to the mobile terminal 200.

(Case B; FIG. 7)

Case B of FIG. 7 is a case executed after the case A. The authentication application 140 is not installed in the mobile terminal 200. First, the same operations as T20, T25 of FIG. 6 are performed.

In T235, the user moves the mobile terminal 200 closer to the MFP 10. In T236 to T243, the MFP 10 and the mobile terminal 200 execute the same processes as T36 to T43 of FIG. 6.

In T245, by using the NFC session established in T240, the MFP 10 sends the AAR including the package name 39 and the NDEF data including the new assignment ID "AAA02" updated in T177 of FIG. 6, to the mobile terminal 200. In T260 to T270, the MFP 10 and the mobile terminal 200 execute the same processes as T60 to T70 of FIG. 6. In T275, the user performs the installation operation on the mobile terminal 200. Thereby, the authentication application 140 is installed in the mobile terminal 200. It should be noted, in a case where the user again moves the mobile terminal 200 closer to the MFP 10, the MFP 10 can register the assignment ID "AAA02" as the authentication ID of the mobile terminal 200 by the same method as T137 to T170 of FIG. 6.

(Case C; FIG. 8)

Case C of FIG. 8 is a case executed after the case A. The authentication application 140 has been installed in the mobile terminal 100, and the authentication ID "AAA01" is being stored in the non-volatile area 136 of the mobile terminal 100. T335 to T343 are the same as T35 to T43 of FIG. 6.

In T345, the MFP 10 sends the AAR including the package name 39 and the NDEF data including the assignment ID "AAA02", to the mobile terminal 100 by using the NFC session. T350, T355 are the same as T150, T155 of FIG. 6.

Since the authentication ID "AAA01" is being stored in the non-volatile area 136 (YES in S340 of FIG. 5), in T360, the mobile terminal 100 sends the NDEF data including the authentication ID "AAA01" and the application ID to the MFP 10 by using the NFC session (S345).

Upon receiving the NDEF data from the mobile terminal 100 by using the NFC session (YES in S225 of FIG. 4), in T365, the MFP 10 executes an authentication using the authentication ID "AAA01" in the NDEF data (S230). Since the authentication ID "AAA01" has been registered in the user table 40, the authentication succeeds. Thereby, the MFP 10 permits the use of the functions corresponding to the respective permission information associated with the authentication ID "AAA01". It should be noted, in the case C, since the assignment ID "AAA02" is not registered in the user table 40 as an authentication ID, the MFP 10 does not update the assignment ID. As described, since the MFP 10 does not update the assignment ID unnecessarily, the processing load of the MFP 10 can be reduced. T370, T375 are the same as T180, T185 of FIG. 6.

(Case D; FIG. 9)

In the initial status of the case D of FIG. 9, the MFP 10 has not registered the authentication ID of the mobile terminal 100. Although the authentication application 140 has been installed in the mobile terminals 100, 200, the authentication ID is not stored in the non-volatile area. First, the same processes as T15 to T45 of FIG. 6 are executed. T410, T415 are the same as T150, T155 of FIG. 6.

In T420, the mobile terminal 100 sends the NDEF data including the assignment ID "AAA01" and the application ID to the MFP 10 by using the NFC session (S350 of FIG. 5). However, since the NFC session is disconnected before the receiving of the NDEF data is completed, the MFP 10 cannot receive all of the NDEF data (NO in S125 of FIG. 3, NO in S355 of FIG. 5). For example, the NFC session is disconnected by the user mistakenly moving the mobile terminal 100 away from the MFP 10 during the reception of the NDEF data.

Since the login state has not been cancelled, the MFP 10 is in a state in which the user name and the password have been inputted (YES in S20 of FIG. 2, YES in S30). In T440, the user moves the mobile terminal 200 closer to the MFP 10. In this case, the MFP 10 and the mobile terminal 200 execute T443 to T490 in the same manner as T136 to T185 of FIG. 6. That is, the MFP 10 sends the AAR including the package name 39 and the NDEF data including the assignment ID "AAA01", to the mobile terminal 200 by using the NFC session of T450.

A configuration is assumed in which the MFP 10 returns to S120 and monitors whether the write command is received, in the case where the NFC session is disconnected before the receiving of the NDEF data from the mobile terminal 100 is completed (NO in S125 of FIG. 3). In this configuration, since the MFP 10 is monitoring the reception of the write command, even if the read command is received from the mobile terminal 200 in T453, the MFP 10 cannot execute the processes following T455. On the other hand, in the present case, the read command is received from the mobile terminal 200 in T453, and the AAR and the NDEF data are sent to the mobile terminal 200 in T455. As a result, the MFP 10 can register the authentication ID "AAA01", and the mobile terminal 200 can store the authentication ID "AAA01".

(Correspondence Relationship)

The MFP 10, the mobile terminal 100, and the mobile terminal 200 are an example of "communication device", "first terminal device", and "second terminal device", respectively. The NFC I/F 22, the memory 24, the memory 34, and the NFC I/F 122 are an example of "wireless interface" of "communication device", "interface memory", "main memory", and "wireless interface" of "terminal device", respectively.

The NFC communication, the authentication application 140, the package name 39 are an example of "short distance wireless communication", "specific application program", "identification information", respectively. The assignment (or authentication) ID "AAA01" is an example of "first authentication information" and "related information". The assignment (or authentication) ID "AAA02" is an example of "second authentication information". The NFC session of T40 of FIG. 6, the NFC session of T340 of FIG. 8, the NFC session of T140 of FIG. 6, the NFC session of T240 of FIG. 7, and the NFC session (not shown) established with the mobile terminal 200 after T75 of FIG. 6 are an example of "first communication session", "second communication session", "third communication session", "fourth communication session" and "fifth communication session", respectively.

(Modification 1)

In S15 of FIG. 2, the CPU 32 of the MFP 10 may supply, to the NFC I/F 22, both an AAR which includes, instead of the package name 39, a URL (abbreviation of Uniform Resource Locator) indicating a location of the authentication application 140 on the Internet and the NDEF data, and may store both the AAR and the NDEF data in the memory 24. That is, "identification information" may be, e.g., a URL.

(Modification 2)

In the above embodiment, the authentication application 140 is installed in the mobile terminal 100 (S370 of FIG. 5) after the user has moved the mobile terminal 100 closer to the MFP 10. Then, the authentication ID is registered in the MFP 10 (S145 of FIG. 3) after the user has again moved the mobile terminal 100 closer to the MFP 10. In a modification, the authentication application 140 may be installed in the mobile terminal 100 and, further, the authentication ID may be registered in the MFP 10 after the user has moved the mobile terminal 100 closer to the MFP 10 only once. In this case, the CPU 32 of the MFP 10 skips S115 to S125 of FIG. 3, and proceeds to S130. After S370, the CPU 132 of the mobile terminal 100 executes S360. Further, the CPU 132 skips S340, and proceeds to S345. That is, "receive related information" can be omitted.

(Modification 3)

In S125 of FIG. 3, the CPU 32 may acquire, instead of the assignment ID, a registration instruction to register the current assignment ID. The registration instruction does not include the assignment ID. That is, "related information" may not be the first authentication information itself, but may be information related to the first authentication information.

(Modification 4)

In the above embodiment, the NFC I/F 22 is an NFC tag, but in a modification, it may be an NFC forum device. In this case, when a communication of each information is executed, the NFC I/F 22 may operate in the CE mode and the NFC I/F 122 may operate in the R/W mode, the NFC I/F 22 may operate in the R/W mode and the NFC I/F 122 may operate in the CE mode, and both the NFC I/Fs 22 and 122 may operate in the P2P mode. That is, "wireless interface" of "communication device" may not be the NFC tag. It should be noted, for the modification in which the NFC I/F 122 operates in the CE mode, the NFC I/F 122 may be an NFC tag.

(Modification 5)

Only the user name and the password may be registered in the user table 40, and all the functions of the MFP 10 may be permitted to all users. Then, one authentication ID may be registered in the memory 34. In this case, the CPU 32 does not update the assignment ID in S140 of FIG. 3. Therefore, an identical authentication ID can be stored in plural mobile terminals 100, 200. Each of the mobile terminals 100, 200 sends the stored authentication ID to the MFP 10 and causes the MFP 10 to execute the authentication. In the case where the authentication succeeds, the MFP 10 permits all the functions of the MFP 10. That is, "second authentication information" may not be stored in the interface memory instead of "first authentication information".

(Modification 6)

In the case of determining NO in S125 of FIG. 3, the CPU 32 of the MFP 10 may return to S120. Further, in the case where an NFC session with the MFP 10 is established after determining NO in S355, the CPU 132 of the mobile terminal 100 may send the write command without sending the read command. In this case, in the case D of FIGS. 9, T453 and T455 are omitted. That is, "wireless interface" of "communication device" may not re-send the identification information and the first authentication information to the first terminal device by using the sixth communication session.

(Modification 7)

S360 of FIG. 5 can be omitted. It should be noted, in this case, when the authentication ID is inputted to the target terminal by the user, the authentication ID may be stored in the target terminal. That is, "store the received authentication information in the non-volatile memory area" can be omitted.

(Modification 8)

In S15, the CPU 32 of the MFP 10 may not supply the AAR to the NFC I/F 22, and may not cause the NFCI/F 22 to store the AAR in the memory 24. That is, the NFC I/F 22 may not send the AAR to the target terminal. In this case, the user needs to perform on the target terminal, in advance, the installation operation and an activation operation for activating the authentication application 140. Further, in another modification, in S15, the CPU 32 may supply, instead of the AAR including the package name 39, the package name 39 to the NFC I/F 22, and may store the package name 39 in the memory 24. In this case, the user needs to perform activation operation on the target terminal in advance, after the authentication application 140 has been installed on the target terminal.

(Modification 9)

"Wireless interface" of "communication device" may not be an I/F for executing an NFC communication, but may be, e.g., an I/F for executing a wireless communication in accordance with another communication system such as Bluetooth (registered trademark), TransferJet (registered trademark), an infrared communication, or the like. Similarly, "wireless interface" of "terminal device" may be an I/F for executing a wireless communication in accordance with another communication system such as Bluetooth, TransferJet, infrared communication, or the like.

(Modification 10)

"Communication device" may not be the MFP 10 capable of executing a plurality of functions, but may be a printer capable of executing only a printing function, a scanner capable of executing only a scanning function, or the like. Further, "communication device" may be a PC, a server, a mobile terminal, or the like.

(Modification 11)

In the above embodiment, the CPU 32 of the MFP 10 implements each of the processes of FIG. 2 to FIG. 4 by executing the program 36 (i.e., software). Instead, at least one of the processes of FIG. 2 to FIG. 4 may be implemented by hardware such as a logic circuit or the like.

What is claimed is:

1. A communication device comprising:
a wireless interface configured to perform a short distance wireless communication and comprising an interface memory;
a processor; and
a main memory storing computer-readable instructions therein, the computer-readable instructions, when executed by the processor, causing the communication device to:
supply both identification information for installing a specific application program and first authentication information to the wireless interface so as to store both the identification information and the first authentication information in the interface memory, and the specific application program being for sending authentication information to the communication device and causing the communication device to execute an authentication using the authentication information, wherein the wireless interface is configured to send both the identification information and the first authentication information in the interface memory to a first terminal device in which the specific application program has not been installed by using a first communication session in a case where the first communication session with the first terminal device is established;
receive the first authentication information from the first terminal device, in which the specific application program has been installed by using the identification information, by using a second communication session in a case where the second communication session with the first terminal device is established via the wireless interface after both the identification information and the first authentication information have been sent to the first terminal device; and
execute an authentication using the first authentication information in a case where the first authentication information is received.

2. The communication device as in claim 1, wherein
the wireless interface is configured to send both the identification information and the first authentication information to the first terminal device by using a third communication session in a case where the third communication session with the first terminal device in which the specific application program has been installed is established, and
the computer-readable instructions, when executed by the processor, further cause the communication device to:
receive related information which is related to the first authentication information from the first terminal device by using the third communication session after the wireless interface has sent both the identification information and the first authentication information to the first terminal device by using the third communication session; and
register the first authentication information in the main memory in a case where the related information is received from the first terminal device,
wherein the first authentication information is received from the first terminal device by using the second communication session in a case where the second communication session with the first terminal device in which the specific application program has been installed is established via the wireless interface after the first authentication information has been registered in the main memory, and
the authentication using the first authentication information is executed by determining whether the received first authentication information is registered in the main memory in a case where the first authentication information is received.

3. The communication device as in claim 2, wherein
the wireless interface is a Near Field Communication (NFC) tag for performing a communication according to NFC standard,
the wireless interface is configured to send, by using the third communication session, both the identification information and the first authentication information to the first terminal device which is operating in a Reader mode of the NFC standard, in the case where the third communication session with the first terminal device is established, and
the related information is received by using the third communication session from the first terminal device which is operating in a Writer mode of the NFC standard.

4. The communication device as in claim 2, wherein
the computer-readable instructions, when executed by the processor, further cause the communication device to:
supply second authentication information different from the first authentication information to the wireless interface so as to store the second authentication information in the interface memory instead of the first authentication information, in the case where the first authentication information is registered in the main memory,
wherein the wireless interface is configured to send both the identification information and the second authentication information in the interface memory to a second terminal device different from the first terminal device by using a fourth communication session in a case where the fourth communication session with the second terminal device is established after the second authentication information has been stored in the interface memory instead of the first authentication information.

5. The communication device as in claim 4, wherein
the wireless interface is configured to send both the identification information and the first authentication information in the interface memory to the second terminal device by using a fifth communication session in a case where the fifth communication session with the second terminal device is established before the second authentication information is stored in the interface memory instead of the first authentication information in the interface memory.

6. The communication device as in claim 4, wherein
the wireless interface is configured to send the second authentication information in the interface memory to the first terminal device by using the second communication session in a case where the second communication session with the first terminal device is established after the second authentication information has been stored in the interface memory instead of the first authentication information,
the first authentication information is received from the first terminal device by using the second communication session after the wireless interface has sent the second authentication information to the first terminal device by using the second communication session, and
new authentication information is not supplied to the wireless interface in the case where the first authentication information is received from the first terminal device by using the second communication session.

7. The communication device as in claim 2, wherein
the wireless interface is configured to send both the identification information and the first authentication information to a second terminal device different from the first terminal device by using a sixth communication session in a case where the sixth communication session with the second terminal device is established via the wireless interface after the third communication session has been disconnected before receiving of the related information from the first terminal device is completed.

8. A non-transitory computer-readable recording medium storing computer-readable instructions for a terminal device,
wherein the computer-readable instructions, when executed by a processor of the terminal device, cause the terminal device to:
after the terminal device has received first authentication information and identification information for installing a specific application program from a communication device and the specific application program has been installed in the terminal device by using the identification information, determine whether second authentication information is stored in a non-volatile memory area of the terminal device in a case where a communication session with the communication device is established via a wireless interface of the terminal device, the wireless interface being configured to perform a short distance wireless communication;
in a case where it is determined that the second authentication information is stored in the non-volatile memory area, send the second authentication information in the non-volatile memory area to the communication device by using the communication session so as to cause the communication device to execute an authentication using the second authentication information; and
in a case where it is determined that the second authentication information is not stored in the non-volatile memory area, send the received first authentication information to the communication device by using the communication session so as to register the received first authentication information in the communication device, the received first authentication information being authentication information received from the communication device by using the communication session.

9. The non-transitory computer-readable recording medium as in claim 8, wherein
the computer-readable instructions, when executed by the processor, further cause the terminal device to:
store the received first authentication information in the non-volatile memory area in the case where it is determined that the second authentication information is not stored in the non-volatile memory area.

10. A non-transitory computer-readable recording medium storing computer-readable instructions for a communication device,
wherein the computer-readable instructions, when executed by a processor of the communication device, cause the communication device to:
supply both identification information for installing a specific application program and first authentication information to a wireless interface of the communication device so as to store both the identification information and the first authentication information in an interface memory of the wireless interface, the wireless interface being configured to perform a short distance wireless communication and comprising the interface memory, and the specific application program being for sending authentication information to the communication device and causing the communication device to execute an authentication using the authentication information, wherein the wireless interface is configured to send both the identification information and the first authentication information in the interface memory to a first terminal device in which the specific application program has not been installed by using a first communication session in a case where the first communication session with the first terminal device is established;
receive the first authentication information from the first terminal device, in which the specific application program has been installed by using the identification information, by using a second communication session in a case where the second communication session with the first terminal device is established via the wireless interface after both the identification information and the first authentication information have been sent to the first terminal device; and
execute an authentication using the first authentication information in a case where the first authentication information is received.

* * * * *